J. BROADLEY.
Improvement in Car-Couplings.
No. 130,408. Patented Aug. 13, 1872.
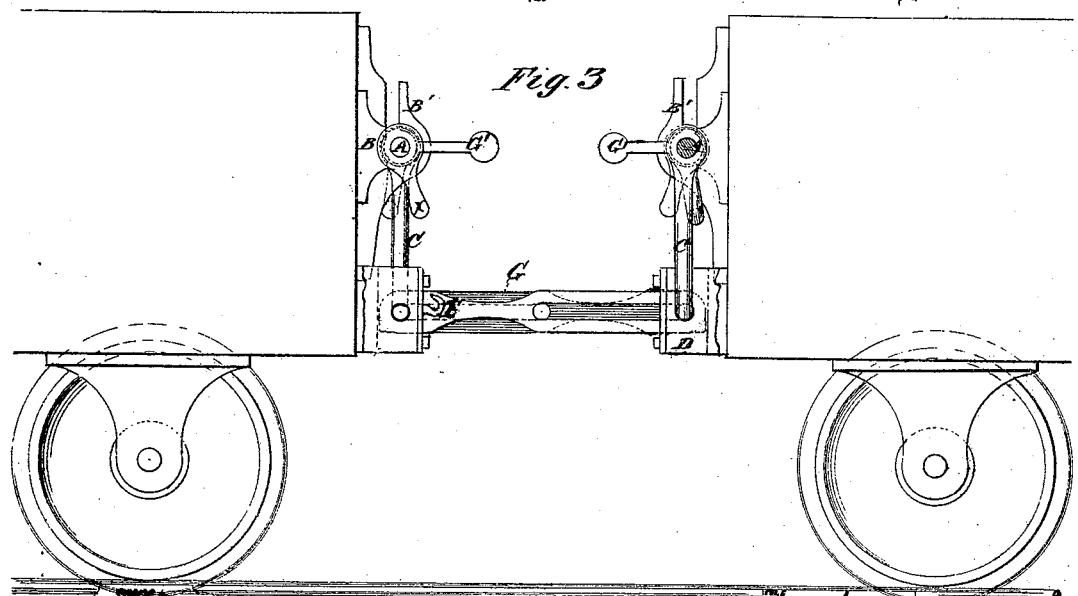

J. BROADLEY.
Improvement in Car-Couplings.

No. 130,408.

2 Sheets--Sheet 2.

Patented Aug. 13, 1872.

Witnesses:
A. W. Almqvist
Geo. W. Mabee

Inventor:
James Broadley
PER
Attorneys.

UNITED STATES PATENT OFFICE.

JAMES BROADLEY, OF BRADFORD, ENGLAND.

IMPROVEMENT IN CAR-COUPLINGS.

Specification forming part of Letters Patent No. 130,408, dated August 13, 1872.

Specification describing a new and Improved Car-Coupling, invented by JAMES BROADLEY, of Bradford, in the county of York, England.

The mechanical arrangements comprising my invention consists of a sliding shaft or bar, working in suitable bearings secured to the ends of the carriage or vehicle at a position somewhat above the usual coupling-chain arrangement, which can be left attached to the carriage or vehicle, and can be made use of when two carriages are to be coupled, one of which is not provided with my coupling arrangements. This sliding shaft or bar has a bolt connected thereto, which bolt is made to work in an orifice provided for it in the sides of a socket or guides secured to the carriage or vehicle. A slotted link is also secured to the carriage or vehicle, to which it is attached by a joint, so that it may be lifted up out of the way and secured by a catch on the sliding shaft when a carriage or vehicle unprovided with my arrangements is to be coupled in the ordinary way. The coupling slotted link is, when two carriages or vehicles are brought together for coupling, down in its ordinary position, and is inserted in the sockets or guides above mentioned by simply bringing the two carriages or vehicles together, and then the sliding shaft can be actuated so as to couple the carriages by handling its end from the side of the carriage without going between the carriages, and the uncoupling can be effected by a similar though reverse action. If thought desirable, lever arrangements might, it is obvious, be adopted, to enable the guard or attachment to work these arrangements without getting down from his place.

Figure 4:
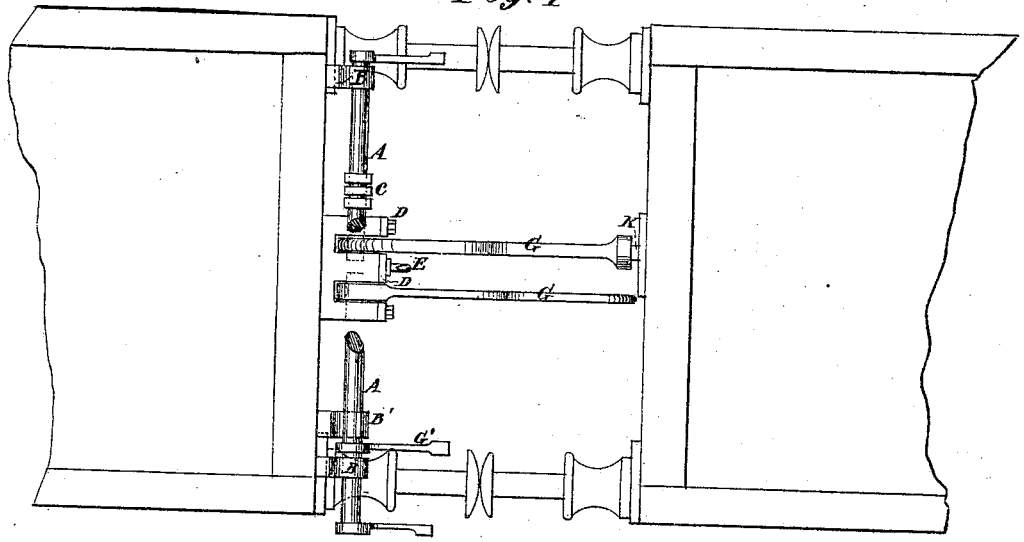
Figure 5:
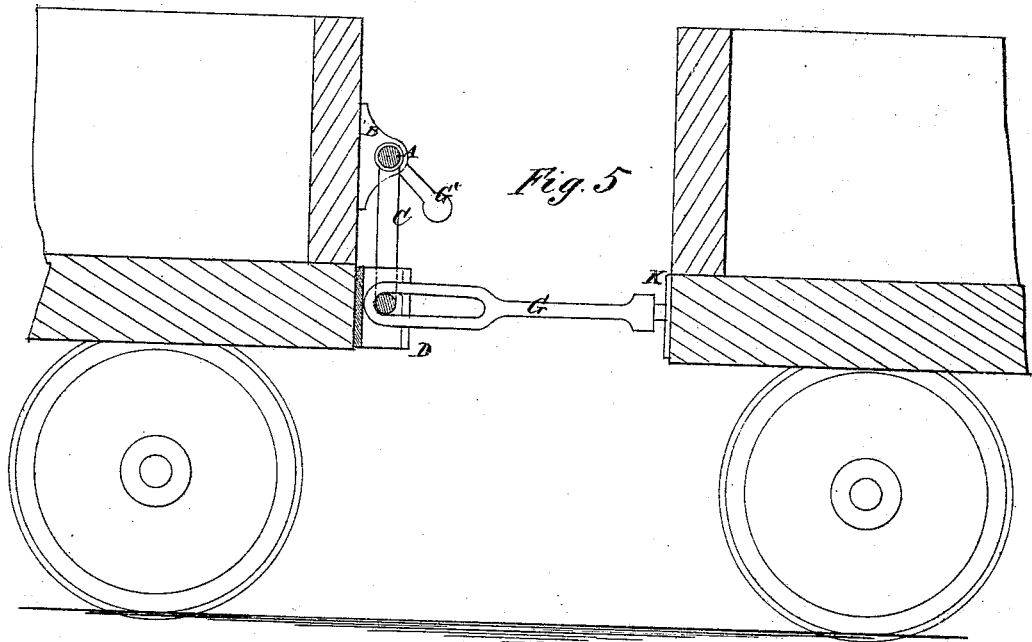

Figure 1 is a plan view. Fig. 2 is a front view of the end of a railway-truck or carriage with my invention applied thereto. Fig. 3 is a side view of parts of two railway-trucks or carriages with my invention applied thereto. Fig. 4 is a plan view, showing a modification of the arrangements exhibited in Figs. 1, 2, and 3. Fig. 5 is a sectional view of parts of two trucks or carriages.

Similar letters of reference indicate corresponding parts.

A denotes the sliding shaft or bar hereinbefore referred to, which is secured (free to move) to the end of the railway-truck or carriage by the straps B and bracket B', the straps having an orifice and the bracket a bearing-socket, through which the sliding shaft works. C is the bolt depending from the said sliding shaft, which works through an orifice provided for that purpose in the side of the socket or guides D D, for the reception of a coupling-link, G. One of these guides is shown in the drawing, with the usual coupling-hook E secured thereto. Each guide-block D has two slots, in one of which the coupling-link G belonging to the carriage is pivoted, so as to be free to be lifted up and secured by the catch H fixed on the sliding shaft A, as shown, whereby the said link G can be kept out of the way when a truck or carriage is brought opposite another truck or carriage not provided with my coupling arrangements; or it may be convenient to adopt this position when a truck or carriage is detached, to avoid breakages. The other slot in the guide-block is to receive the free end of the coupling-link of the other car. G' is a guard-bar, projecting from shaft A to prevent same and bolt C getting out of place when coupled or uncoupled, by being brought down by the side of B' when coupled, and so remaining until the attendant makes a reverse motion, whereby he can prove, even in the dark, if the coupling or uncoupling is effected.

Figs. 4 and 5 show the modified form in which my invention can be applied to carriages and trucks where the ordinary hook is dispensed with altogether, as when the same is removed from an old carriage or truck. In these figures it will be seen that the guide-block D is not used in the same form of arrangement as in Figs. 1, 2, and 3—that is, upon both the cars to be coupled—the coupling-links G being secured by having a rod, K, to the spring of the ordinary coupling-hook in the place of the rod of the hook. The other parts will remain similar to those in the other figures.

It is to be noted that the sockets or guides D D are to be continued by an opening made in the framing, or of the truck or carriage, to allow of the coupling-link to go through without damage when the buffer springs are pressed up. Likewise, that there should be a plate behind the cross-beam of carriage end, and bolted right through the block D D and caps in front, to make all firm and solid.

Having thus described my invention, I claim as new, and desire to secure by Letters Patent—

A car-coupling, comprising a sliding shaft with a coupling-bolt, a coupling socket or guides, coupling-link, and a catch for holding up said link when uncoupled, all combined substantially as specified.

The above specification signed by me this 10th day of October, 1870.

JAMES BROADLEY. [L. S.]

Witnesses:
JNO. HENRY WADE,
*Solicitor, Bradford.*
WILLIAM A. STORRY,
*His Clerk.*